United States Patent [19]

Jin et al.

[11] Patent Number: 5,781,677
[45] Date of Patent: Jul. 14, 1998

[54] MAGNETICALLY TUNABLE OPTICAL FIBER GRATINGS

[75] Inventors: Sungho Jin, Millington; Paul Joseph Lemaire, Madison; Thomas A. Strasser, Chatham, all of N.J.

[73] Assignee: Lucent Technologies Inc., Murray Hill, N.J.

[21] Appl. No.: 791,081

[22] Filed: Jan. 29, 1997

[51] Int. Cl.⁶ .................................................. G02B 6/34
[52] U.S. Cl. ........................................ 385/37; 385/6
[58] Field of Search .............................. 385/1, 4, 6, 10, 385/12, 13, 31, 37

[56] References Cited

U.S. PATENT DOCUMENTS 5,144,690  9/1992  Domash ............................... 385/12
5,394,488  2/1995  Fernald et al. ....................... 385/13

*Primary Examiner*—John D. Lee

[57] ABSTRACT

In accordance with the invention, a tunable fiber grating comprises a fiber grating secured between a pair of magnets so that magnetic force (repulsive or attractive) applied to the magnets is transmitted to the grating. An electromagnet is disposed adjacent the magnets for applying the field to magnetize them. Control of the current applied to the electromagnet permits control of the force transmitted to the fiber grating and, thus, control of the grating strain, spacing and reflection frequency. In a preferred embodiment the electromagnet is actuated to produce magnetic pulses which control the remanent force between the two magnets, eliminating the need for continuous power. An add/drop multiplexer employing the tunable gratings is described.

15 Claims, 7 Drawing Sheets

MAGNETICALLY TUNABLE OPTICAL FIBER GRATINGS

FIELD OF THE INVENTION

The present invention relates to optical fiber gratings and, in particular, to fiber gratings tunable by magnetic force.

BACKGROUND OF THE INVENTION

Optical fibers are key components in modern telecommunications systems. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high purity silica with minor concentrations of dopants to control the index of refraction.

Optical fiber Bragg gratings are important elements for selectively controlling specific wavelengths of light within an optical fiber. A typical Bragg grating comprises a length of optical fiber including a plurality of perturbations in the index of refraction substantially equally spaced along the fiber length. These perturbations selectively reflect light of wavelength $\lambda$ equal to twice the spacing $\Lambda$ between successive perturbations, i.e. $\lambda = 2n_{eff}\Lambda$, where $\lambda$ is the vacuum wavelength and neff is the effective refractive index of the propagating mode. The remaining wavelengths pass essentially unimpeded. Such Bragg gratings have found use in a variety of applications including filtering, stabilization of semiconductor lasers, reflection of fiber amplifier pump energy, and compensation for fiber dispersion.

Conventional fiber Bragg gratings are conveniently fabricated by providing fiber with one or more dopants sensitive to ultraviolet light, such as fibers having cores doped with germanium oxide, and exposing the fiber at periodic intervals to high intensity ultraviolet light from an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

A difficulty with conventional fiber gratings is that they filter only a fixed wavelength. Each grating selectively reflects only light in a narrow bandwidth centered around $\lambda = 2n_{eff}\Lambda$. However in many applications, such as multiplexing, it is desirable to have a tunable grating whose wavelength response can be controllably altered.

One attempt to make a tunable fiber grating uses a piezoelectric element to strain the grating. See Quetel et al., 1996 Technical Digest Series, Conf. on Optical Fiber Communication, San Jose, Calif., Feb. 25–Mar. 1, 1996, Vol. 2, p. 120, paper No. WF6. The difficulty with this approach is that the strain produced by piezoelectric actuation is relatively small, limiting the tuning range of the device. Moreover, it requires a continuous application of relatively high voltage, e.g., approximately 100 volts for 1 nm strain. Accordingly, there is a need for a tunable fiber grating having an enhanced tuning range and no requirement for continuous power.

SUMMARY OF THE INVENTION

In accordance with the invention, a tunable fiber grating comprises a fiber grating secured between a pair of magnets so that magnetic force (repulsive or attractive) applied to the magnets is transmitted to the grating. An electromagnet is disposed adjacent the magnets for applying the field to magnetize them. Control of the current applied to the electromagnet permits control of the force transmitted to the fiber grating and, thus, control of the grating strain, spacing and reflection frequency. In a preferred embodiment the electromagnet is actuated to produce magnetic pulses which control the remanent force between the two magnets, eliminating the need for continuous power. An add/drop multiplexer employing the tunable gratings is described.

BRIEF DESCRIPTION OF THE DRAWINGS

The advantages, nature and additional features of the invention will appear more fully upon consideration of the illustrative embodiments described in the accompanying drawings. In the drawings.

It is to be understood that these drawings are for purposes of illustrating the concepts of the invention and are not to scale. The same reference numerals are used to designate similar elements throughout the drawings.

DETAILED DESCRIPTION

Figure 1A:
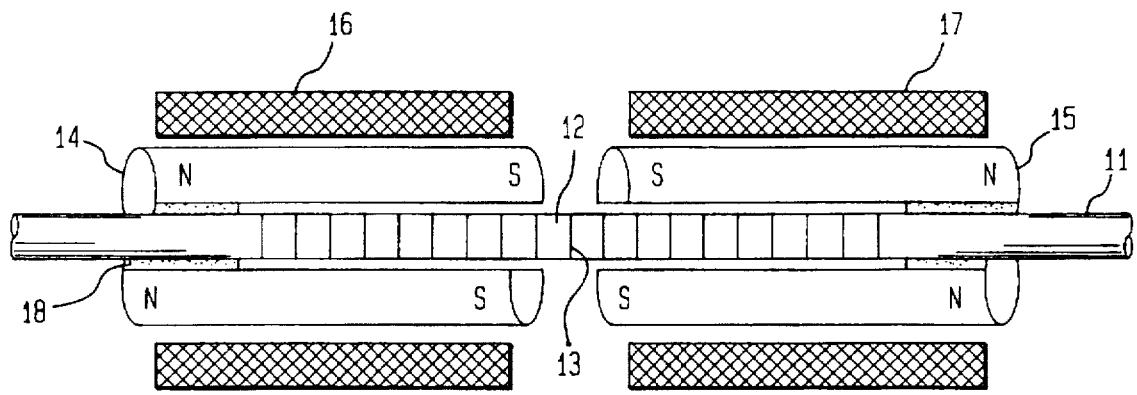
FIGS. 1(a) and 1(b) schematically illustrate tunable fiber gratings using magnetic strain tuning.

Referring to the drawings, FIG. 1(a) schematically illustrates a tunable fiber grating 10 comprising a length of optical fiber 11 including a grating 12 of index perturbations 13. The fiber in the region of the grating is secured, as by bonding or mechanical attachment, between a pair of magnets 14, 15 for transmitting force between the magnets to the grating 12. The magnets can be permanent magnets or, less preferably, bodies of soft magnetic material such as iron. The magnets can conveniently be cylinders each concentrically surrounding the fiber. One or more electromagnets (solenoids) 16, 17 are disposed adjacent the magnets 14, 15 for providing a controllable magnetic field between them.

Figure 1B:
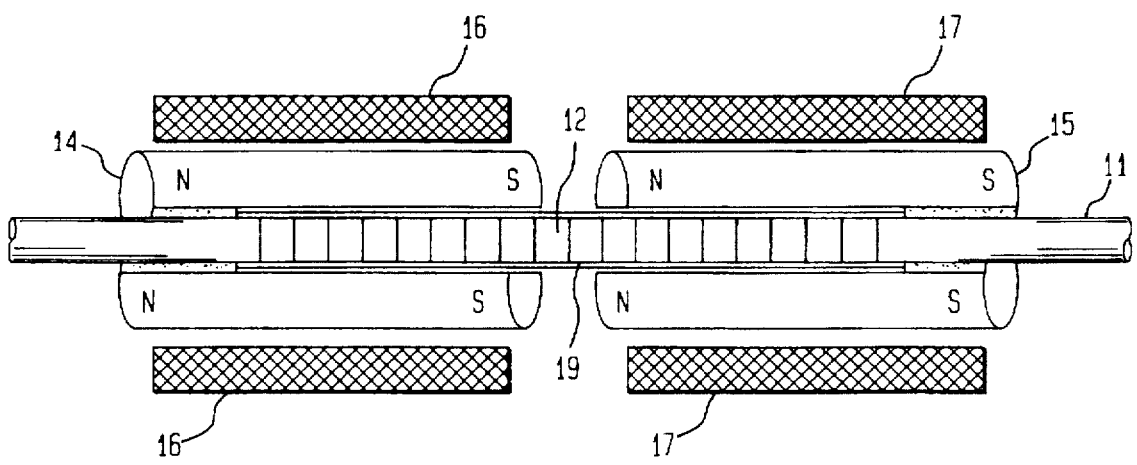

The fiber grating is firmly attached to the magnets, either by mechanical clamping or by bonding, as with epoxy or solder. In the use of solder, the fiber surface is desirably coated with a metal layer to improve solder bond strength. Here the adhesive is shown as bonding layers 18. Where, as illustrated, similar magnetic poles are adjacent (S adjacent S), the field forces the magnets apart along direction of the fiber grating. Alternatively, as shown in FIG. 1(b) magnets 14, 15 can be oriented so that opposite poles are adjacent (S adjacent N, and the field from electromagnets 16, 17 will produce a compressive strain on the grating. In this case, a fiber retainer tube (capillary tube) 19 is preferably provided to avoid localized fiber deflection.

On operation, the force transmitted from the magnets to the grating produces a strain which changes the wavelength response of the grating. When the fiber grating is stretched or compressed, e.g., 1% in length ($\epsilon = \Delta l/l = 0.01$), the grating periodicity Λ will also change. However, the resonating Bragg reflection wavelength λ will not change by exactly 1%, since the interatomic distance in the glass is also affected by the elastic strain and as a result the refractive index n is altered. This strain effect on refractive index can be represented by a photoelastic constant $P_e$ which is typically about 0.22 for the $SiO_2$ fiber. The wavelength change induced by the magnetically applied strain $\epsilon(\epsilon=\Delta l/l)$ is thus expressed as $\Delta\lambda/\lambda=(\epsilon l/l)$ $(1-P_e)=\epsilon(1-P_e)$. The strain $\epsilon$ is determined by the applied stress (σ) and the elastic modulus (E), $\epsilon=\sigma/E$, and the stress on the fiber is the force (F) divided by the cross-sectional area $(\pi r^2)$ where r is the radius of the fiber grating. Rearranging these equations, $\Delta\lambda/\lambda=(F/\pi r^2)(1/E)(1-P_e)$. For example, for λ=1550 nm, F=1200 gm gives a shift in wavelength Δλ=16.01 nm or about 1% change. For a wavelength-division-multiplex channel spacing of 0.8 nm, this induced Δλ is sufficient to alter the filtered wavelength over a 20 channel span.

Figure 2:
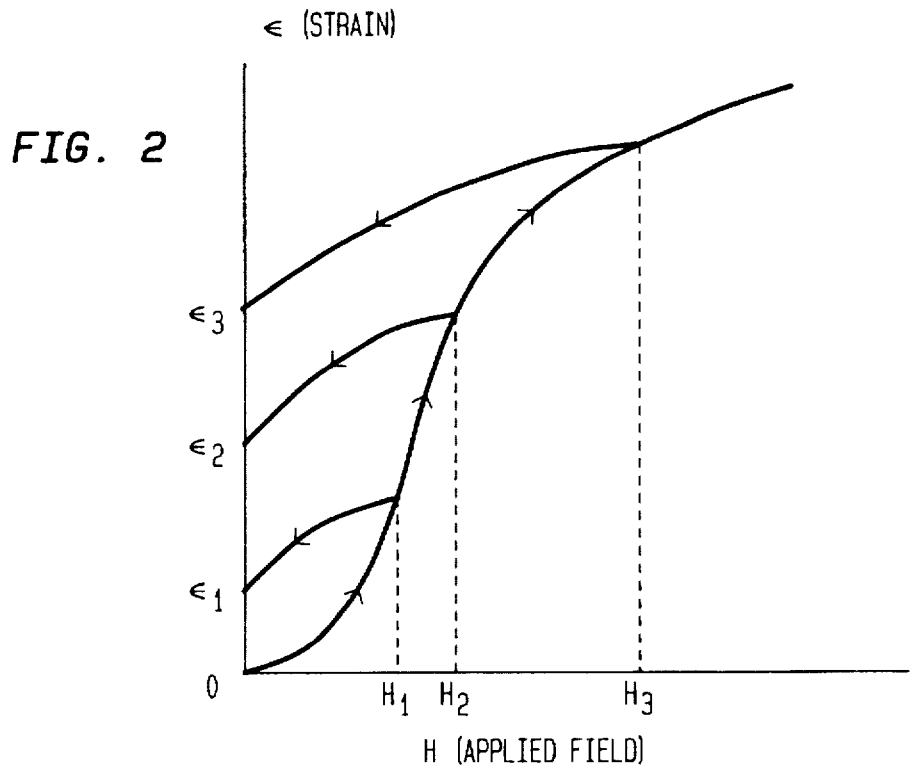
FIG. 2 is a schematic graphical illustration useful for describing the programmability of remanent fiber strain by adjusting applied magnetic field pulses.

An important advantage of this device is that continuous power is not required to maintain a wavelength shift. FIG. 2 is a schematic plot of the strain e in the fiber as a function of the applied magnetic field H. There is a left-over remanent strain after the field is removed. The remanent strains for the field strengths $H_1$, $H_2$, and $H_3$ are $\epsilon_1$, $\epsilon_2$, and $\epsilon_3$, respectively. The magnitude of this remanent strain depends on the magnitude of the applied field, and it is therefore programmable by selecting a proper field strength. To change s to a higher value, the applied H in a subsequent pulse is raised by increasing the pulse current in the solenoid. To lower $\epsilon$, a demagnetizing AC current with a diminishing amplitude is applied to partially demagnetize the magnets and the new magnetizing DC current pulse is applied to achieve the new desired remanent magnetization state.

Figure 3:
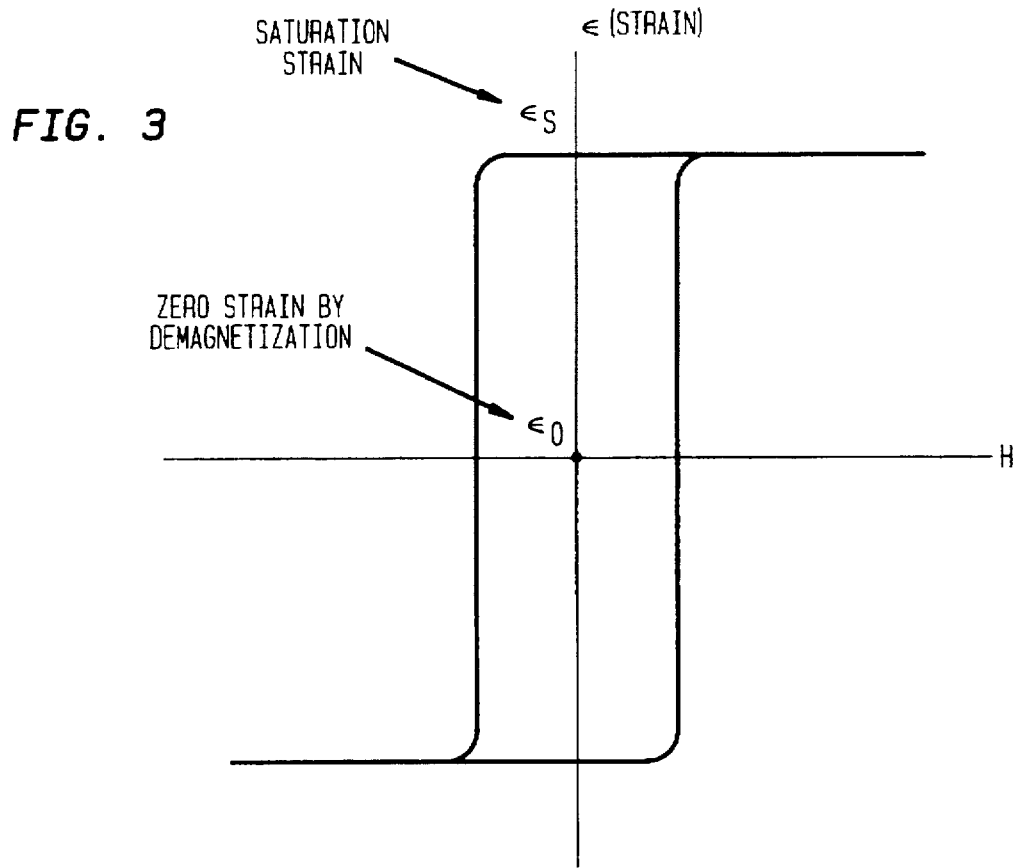
FIG. 3 is a schematic graphical illustration showing bistable magnetically induced fiber strain.

Instead of a continuously tunable grating, the device can be bistably tuned between two wavelengths. A magnetic material with strong anistropy and an axis of magnetization aligned parallel to the optical fiber axis has a square hysteresis loop. See Jin et al., EEE Trans. Magn., MAG-23, No., 5, p. 3187 (1987), which is incorporated herein by reference. FIG. 3 is a plot of the strain 6 vs applied field H for a cyclic variation showing a square hysteresis loop. The use of deformation aged Fe-Cr-Co alloys is partially preferred for magnets exhibiting such a loop shape.

With magnets exhibiting a square hysteresis loop, one can make bistable strain devices that switch between two wavelengths: e.g. a zero strain Bragg reflection wavelength λ and a saturation-strained reflection wavelength $\lambda_1$. $\lambda_0$ is achieved by applying an AC demagnetizing field. $\lambda_1$ is achieved by a DC pulse current sufficient to saturate the magnets. The advantage of the bistable device is reduced sensitivity to the applied current or to stray magnetic fields.

Figure 4:
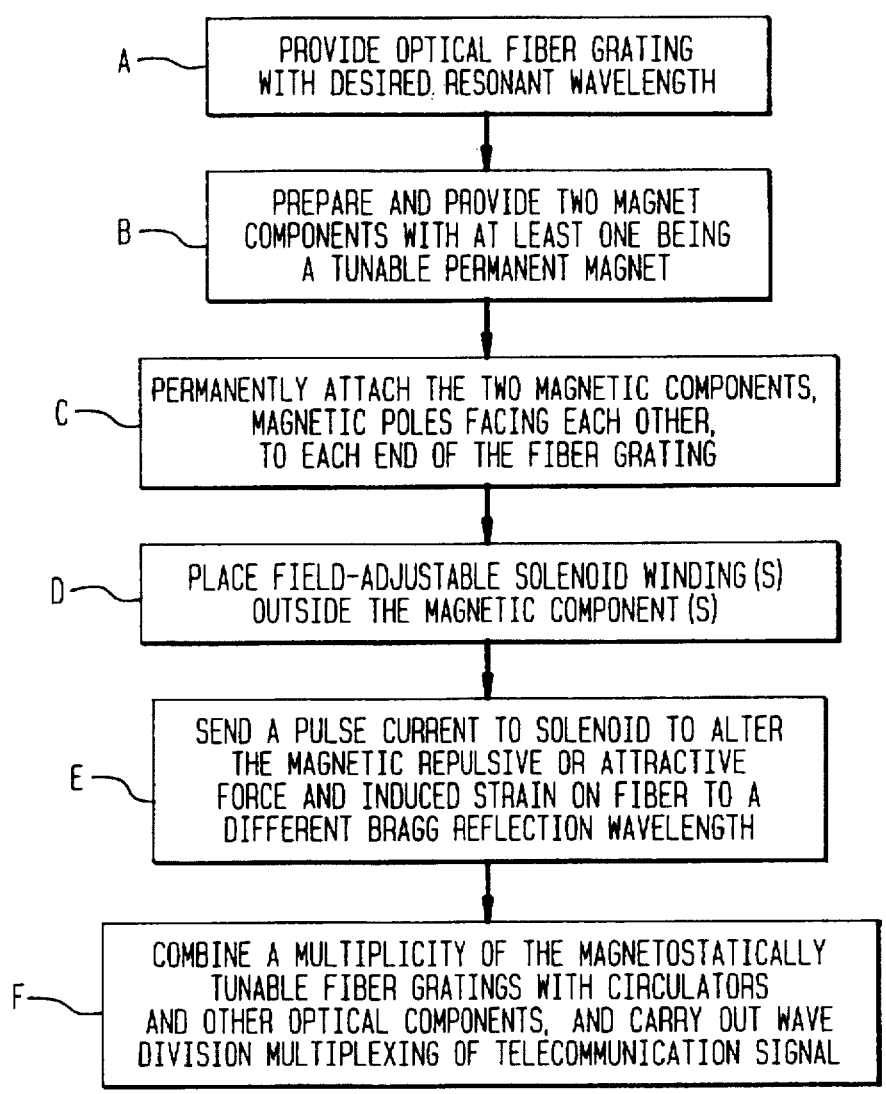
FIG. 4 is a flow diagram illustrating a preferred method for making and using the devices of FIGS. 1(a) and 1(b).
Figure 5A:
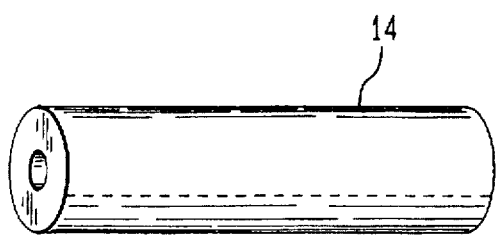
FIGS. 5A–5E, 6A–6C, 7 and 8 schematically illustrate various alternative embodiments of the FIG. I device.
Figure 5B:
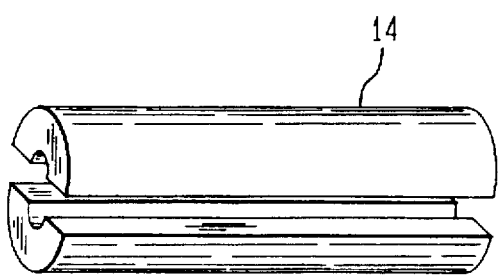
Figure 5C:
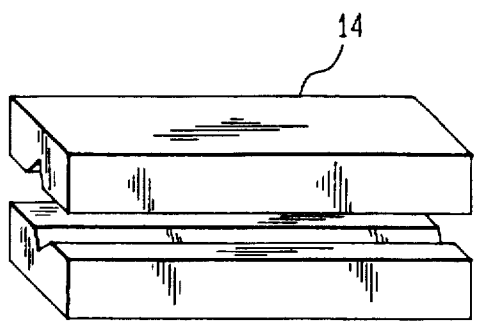
Figure 5D:
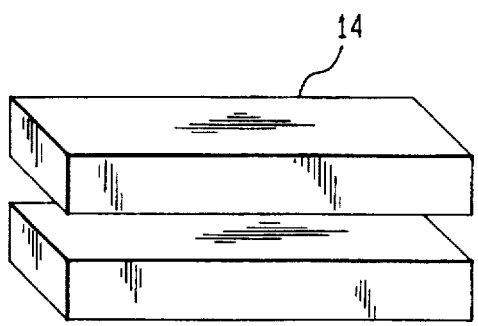
Figure 5E:
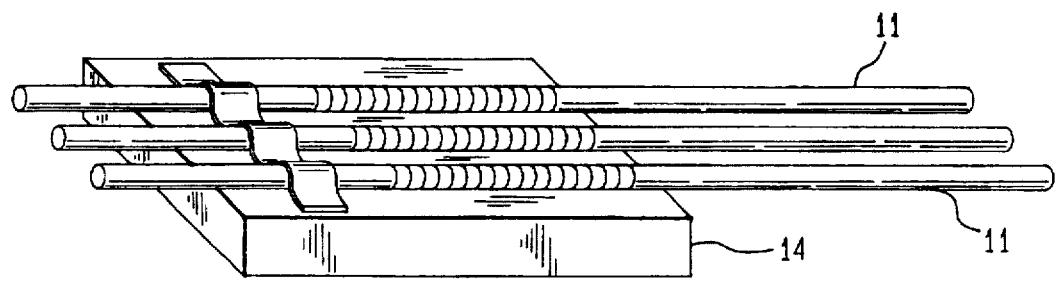

FIG. 4 is a flow diagram illustrating the steps in the preferred process for making the tunable optical fiber grating of Figs 1(a) and 1(b). The first step shown in block A is to provide an optical fiber grating having a desired Bragg reflection wavelength for dropping or adding a wavelength component. For example, for a median light beam wavelength of 1550 nm, the grating periodicity Λ in a $SiO_2$ based fiber (with a refractive index n~1.45) is 500 nm. The length of each optical fiber grating to be incorporated into the grating assembly is typically in the range of 5mm to 100 mm and preferably in the range of 10–50 mm. For the short fiber grating, the region of the regular fiber outside the grating can be used for attachment to the magnetic components.

The next step shown as block B is to provide magnetic components to be attached to the fiber grating. At least two magnetic components, each either a single piece or an aggregate, are needed. They are oriented with their magnetic poles parallel to the axis of the fiber grating. At least a portion of each magnetic component should be semi-hard or permanent with a remanent magnetization. Yet its strength should be reprogrammable by altering the applied magnetic field. When the two magnets have the same magnetic poles facing each other, e.g., the south against the south pole, they repel each other. The fiber grating attached to them is under tensile stress, with the tensile elastic strain s proportionally increasing as the stress a is increased ($\epsilon=\sigma/E$ where the elastic modulus $E=10.5\times10^6$ psi for silica glass). When the two facing poles are different, i.e., south against north, the two magnets are attracted to each other by magnetic force, and the fiber grating is under compressive stress. When a compressive stress is used, undesirable buckling or deflection of the fiber grating should be prevented or minimized, as by the use of a capillary tube restricting the off-axis movement of fiber grating. A suitable low-friction coating such as a fluorocarbon or diamond may optionally be used for easy sliding of the fiber in the tube.

The third step (block C of FIG. 4) is to align and attach the two magnetic components onto the fiber. The magnets can have a cylindrical configuration or a blocky configuration. In the exemplary embodiment of FIG. I both ends of the fiber grating (areas outside the active Bragg reflection region) are firmly attached to each of the two tunable magnet components. To assure a strong bonding and minimize strain relaxation at the interface of the fiber and the magnet components, the use of mechanically strong, non-thermoplastic adhesive or a solder with a relatively high melting point and high mechanical strength is desired. The fiber surface to be attached is desirably coated with a metal layer to improve the solder bond strength.

For maximizing the magnetic force for a given volume of the magnet, the air gap between the facing poles should be very small. The magnetic force decreases as the gap is increased. The preferred gap is less than about 0.200", and more preferably, less than 0.050".

The preferred magnet materials are those whose magnetic properties are modifiable by a pulse magnetic field. Some examples of suitable magnets are Fe—Cr—Co, Fe—Al—Ni—Co (Alnico), Cu—Ni—Fe (Cunife), Co—Fe—V (Vicalloy), specially-processed, low-coercivity ($H_c$) rare earth cobalt (Sm—Co) or Nd—Fe—B magnets, and Ba-ferrite or Sr-ferrite magnets. The desired range of the coercivity is typically below 3000 Oe and preferably below 1000 Oe for the ease of programming by re-magnetization using solenoid pulse field. The coercivity is typically above 50 Oe and preferably above 200 Oe for maintaining the stability of the remanent magnetization and also for stability against demagnetization due to stray magnetic fields. Mechanically ductile and easily machineable magnet alloys such as Fe—Cr—Co, Cu—Ni—Fe, Co—Fe—V are particularly desirable for shaping into desired geometry. Stable permanent magnets with high coercive forces, such as Sm-Co or Nd—Fe—B are less desirable (unless modified to exhibit lower coercive forces) because of the difficulty in reprogramming the remanent magnetization using low magnetic field. These stable magnets, however, can be used for supplying a basis (or bias) field, in combination with programmable magnets.

The next steps in FIG. 4 (Steps D and E) are to add at least one solenoid winding around the magnetic components and to apply a programmed pulse field to adjust the remanent magnetization in the magnets. This adjustment alters the force and the strain on the fiber grating. A constant DC field, instead of a pulse field can also be used, but the use of a DC pulse field is preferred so that a constant supply of electrical current to the solenoid is avoided. The desired duration or speed of the pulse field is typically in the range of $1-10^{-8}$ seconds, preferably $1-10^{-6}$ seconds and even more preferably $10^{-1}-10^{-4}$ seconds. For a thick magnet geometry, the use of pulses that are too fast is not desirable because of the eddy current loss. The shape of the current pulse can be rectangular, rectified sinusoidal or irregular as long as the maximum field needed for a magnetization to the predetermined remanence is accomplished.

FIG. 5(a) through 5(e) shows the shapes of a variety of useful magnetic components 14, 15. The magnets can be cylinders with a center hole (FIG. 5(a)), round or block-like, two-piece magnets (FIG. 5(b)–(d)), or substrate-like magnets (FIG. 5(e)). The two piece magnet configuration with center axis aligning grooves is preferred because of its convenience for device assembly.

Figure 6A:
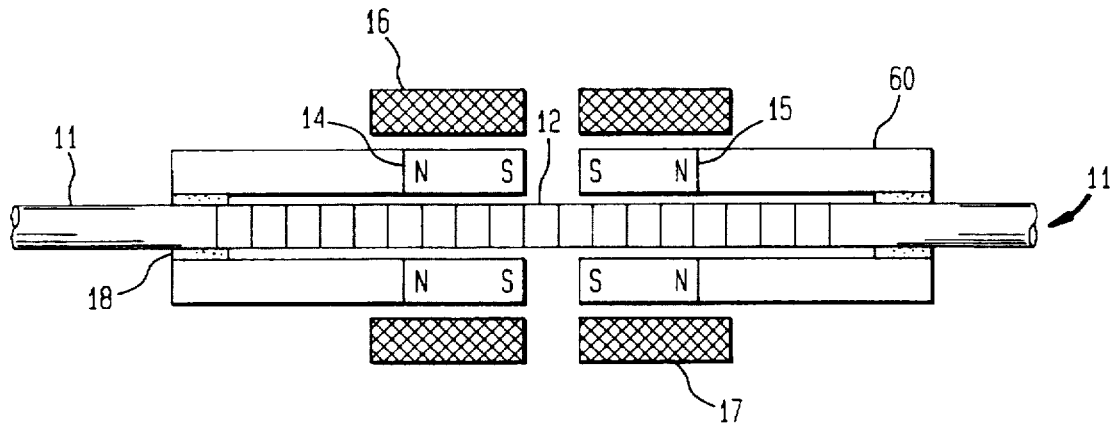
Figure 6B:
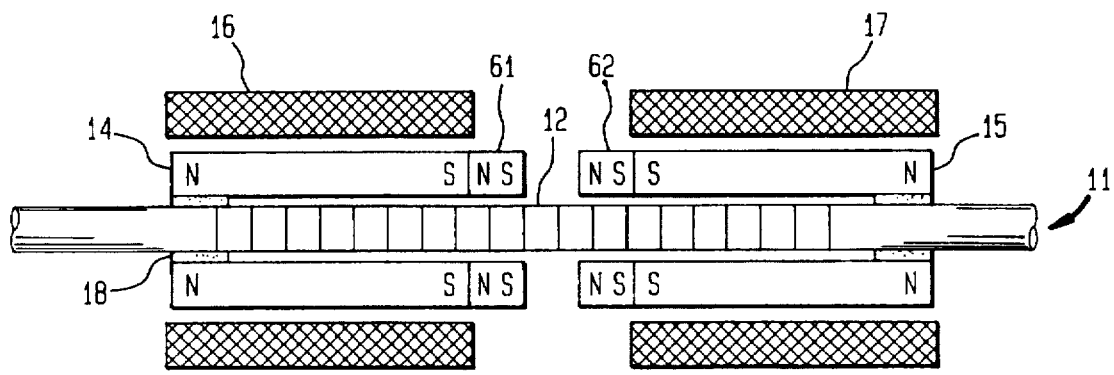
Figure 6C:
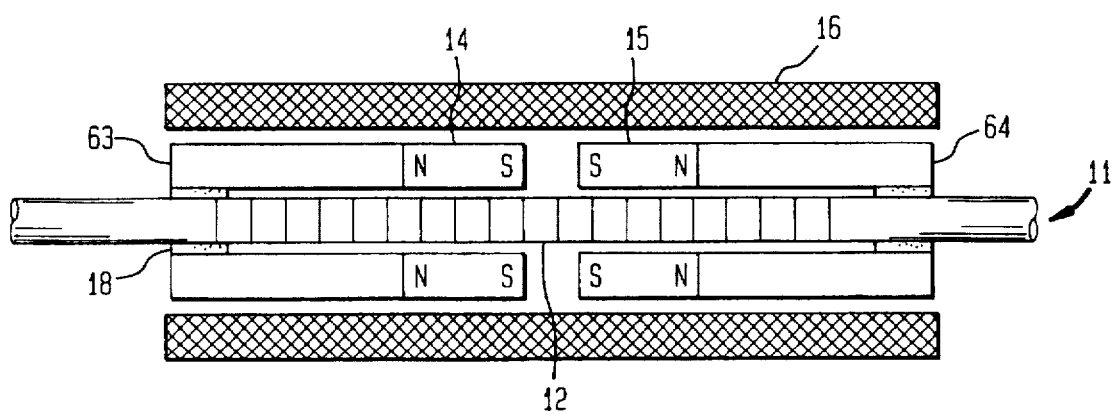
Figure 7:
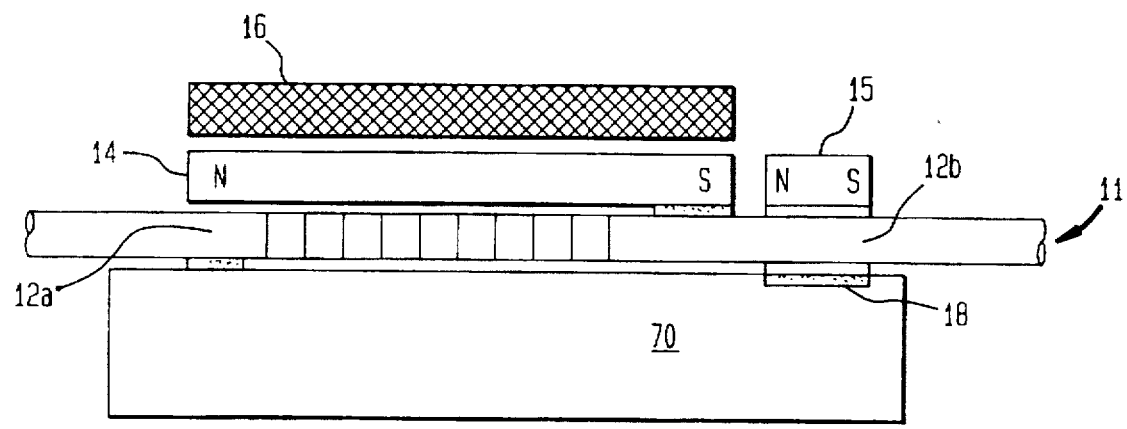
Figure 8:
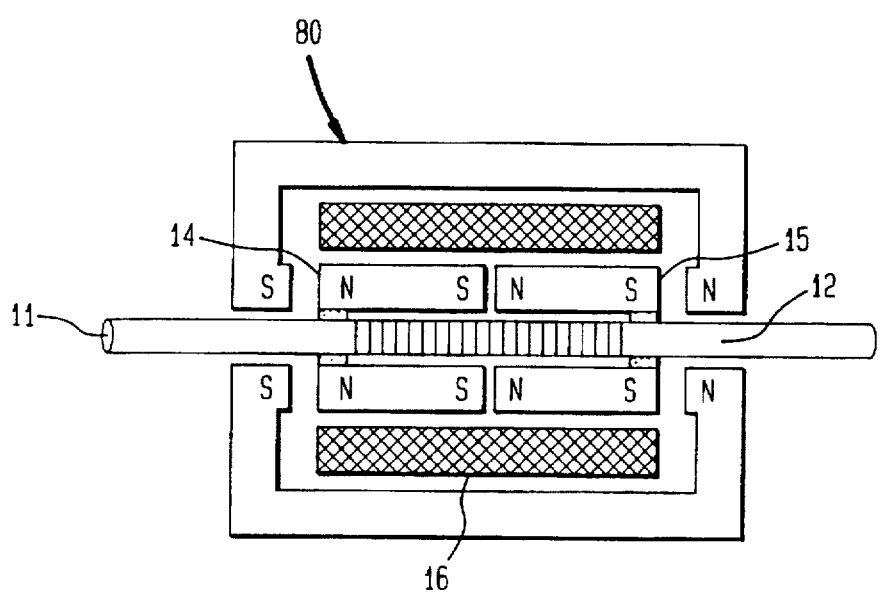

While the device configuration illustrated in FIG. 1 is one of the simplest, other embodiments are depicted in FIGS. 6–8. In the embodiment of FIG. 6(a), the two programmable magnets 14, 15 and the accompanying solenoids 16, 17 are shorter than in FIG. 1, but are still facing each other with a small air gap. The magnets are secured to the fiber through extensions of nonmagnetic material 60 such as glass, aluminum, copper, or stainless steel. This configuration is viable when the magnitude of desired wavelength tuning is not extensive, and when the short magnets provide sufficient magnetic force. In the alternative embodiment of FIG. 6(b) small but strong, high-coercivity magnets 61, 62 (such as Nd—Fe—B or Sm—Co) which provide the bias field are combined with low-coercivity programmable magnets 14, 15. The high coercivity magnets are secured to the fiber through extensions of low coercivity magnetic material. It is also possible, as illustrated in FIG. 6(c) to tune the programmable magnets 14, 15 through field-amplifying soft magnets 63, 64 (such as iron, Ni—Fe permalloy, Si-steel, etc) for the purpose of obtaining a higher magnetizing field using a small electrical current in the solenoid.

FIG. 7 illustrates yet another embodiment where a substrate 70 allows a tensile stress (instead of compressive stress) to be applied to the fiber grating using magnetic attraction between unlike poles. This configuration is convenient in that a tensile force on fiber eliminates the need to guard against possible fiber buckling. Also, an attractive magnetic force maintains the axial alignment of magnets with a minimal need to guard against lateral force. In this configuration, one end of the fiber grating 12A is firmly fixed onto the substrate. The other end of the grating is 12B fixed onto the leading end of the programmable magnet 14. Another magnet 15 with a magnetically attractive arrangement is attached onto the substrate further away from the leading end of the programmable magnet. Thus one magnet is secured to the fiber through a nonmagnetic substrate.

The smaller magnet 15 can either be a programmable magnet or a non-programmable magnet that contributes to the overall magnetic attractive force. In the latter case, very strong magnets, such as, Sm—Co or Nd—Fe—B magnets, can be used. Alternatively, a field amplifying soft magnetic material can be used instead of the strong magnet. If the attachment configuration and locations of fiber-substrate and magnet-fiber bonding are modified, a compressive, instead of tensile, stress on the fiber grating can be produced using a magnetic attraction force.

FIG. 8 shows an embodiment including a magnetic return path 80 of soft magnetic material employed for reduced leakage flux and maximum utilization of magnetic strength of the magnets with a given volume. The return path extends between opposite poles of magnets 14, 15 respectively.

The gratings described herein are especially useful in wavelength division multiplexed communications system which employ multiplexer/demultiplexer devices. In such systems, a "trunk" fiber carries optical signal channels at several wavelengths $\lambda_1, \lambda_2, \ldots \lambda_n$ and it is desirable to extract a single wavelength channel from the trunk fiber or to add a single wavelength channel onto the trunk. A wide variety of such devices can be made by interconnecting optical circulators and fiber gratings. Typically the channel reflected by the grating is dropped to the trunk fiber or is added to the trunk. Gratings as described herein permit selection at the grating of which channel is dropped or added.

Figure 9:
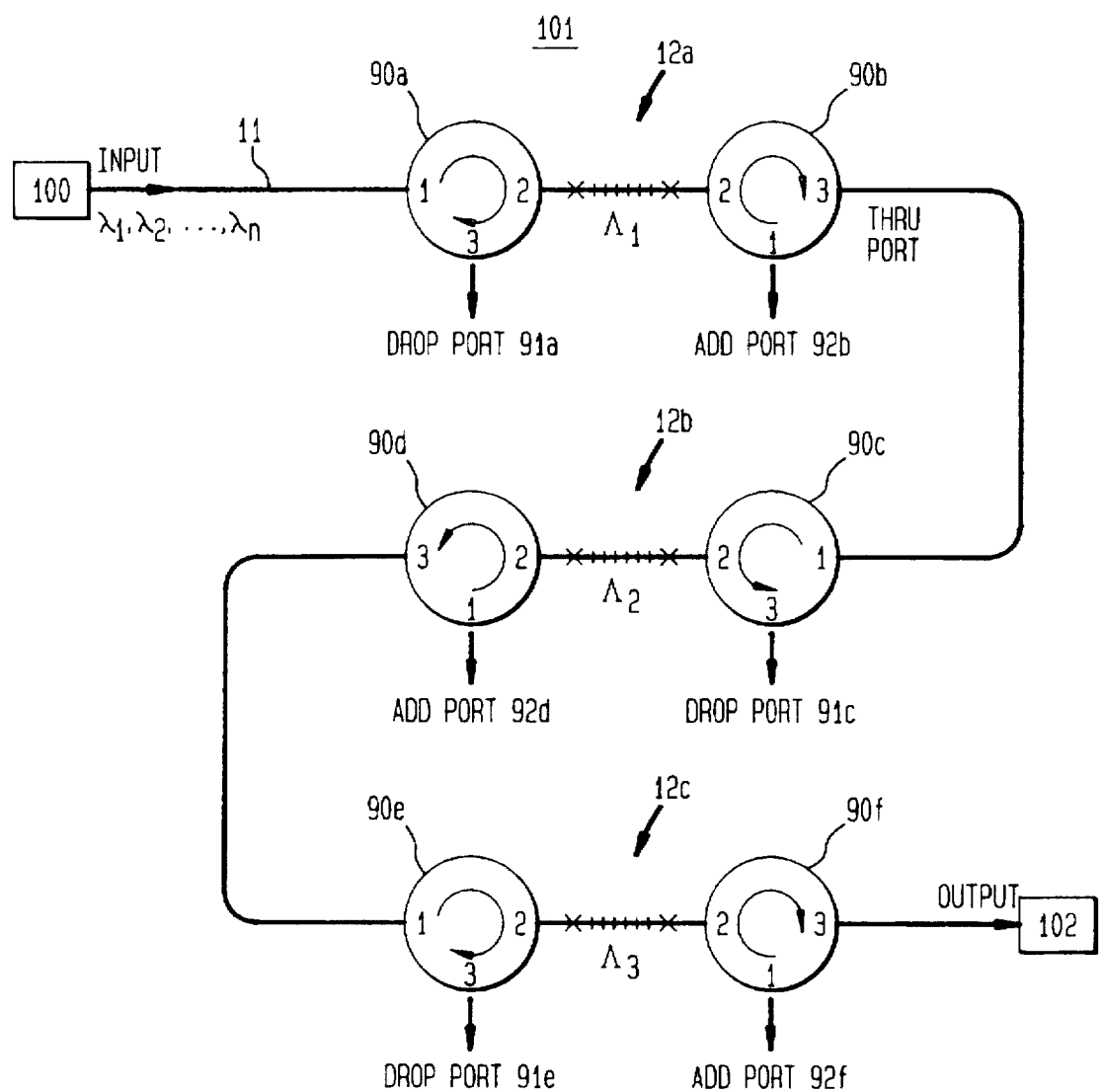
FIG. 9 illustrates an N-channel optical ADD/DROP multiplexing device using a tunable fiber grating.

FIG. 9 schematically illustrates a wavelength division multiplexed (WDM) communications system comprising a transmitter 100, an improved N-channel multiplexer/demultiplexer 101 and a receiver 102, all connected by trunk fiber 11. The input on fiber 11 consists of optical signals at several wavelengths, $\lambda_1$ to $\lambda_n$.

The improved multiplexer 101 comprises one or more pairs (here 3 pairs) of circulators. The circulators of each pair are separated by a grating. For example, the first pair of circulators comprises upstream circulator 90A and downstream circulator 90B separated by grating 12A The second pair is 90C and 90D separated by grating 12C. In each pair, the upstream circulator (90A, 90C, 90E) serves to divert a forward propagating channel that matches the corresponding grating (12A, 12C, 12E) into a corresponding DROP port 91A, 91C, 91E. The downstream circulator (90B, 90D, 90F) similarly serves to insert into fiber 11 signals at ADD ports 92B, 92D, 92F, provided the wavelengths of the signals to be added correspond to the respective gratings 12A, 12C and 12E.

The device is improved by making any one of these gratings 12A, 12C, 12E tunable as set forth above, and preferably by making each tunable. If the grating is tuned so that it coincides with a different channel, then the different channel can be added or dropped. Moreover, a tunable grating can also perform a DISABLE function. If the grating is tuned between the channels, then the ADD/DROP function is temporarily disabled.

In alternative embodiments the improved multiplexer can comprise a single pair of circulators with a plurality of tunable gratings disposed between them for performing ADD, DROP or DISABLE functions.

EXAMPLE

A 32-channel, reconfigurable ADD/DROP system for Wavelength Division Multiplexing is constructed using 32 magnetostatically tunable fiber gratings connected in a series with associated circulators or directional couplers to serve as ADD or DROP ports as schematically illustrated in FIG. 9.

The nominal (mean) wavelength of the optical signal to be processed is 1550 nm, and the signal wavelength channels are separated from one another by a spacing of 0.8 nm producing a center-to-center spacing with a channel width of 0.3 nm. The refractive index periodicity ($\Lambda$) of each grating is made into a predetermined dimension so that all 32 gratings have their Bragg reflection wavelengths off by a half channel (placed at the mid-channel positions), and hence with no tuning activated, all 32 wavelength signals pass through the ADD/DROP system without being filtered (dropped). If a certain selected group of channels (e.g., Channels #1, #5, and #27) need to be dropped, the magnetostatic tuning devices for those gratings are activated by a magnetic pulse field so as to strain the fiber gratings by ½ channel, e.g., $\Delta\lambda/\lambda$ of roughly 0.4 nm/1550 nm≈0.025%. The programmable magnet material and the magnitude of the magnetic field applied is predetermined to produce and maintain this amount of remanent strain in the fiber, and to make the channels #1, #5 and #27 Bragg reflected and filtered (dropped). To cancel the DROP operation of a channel, e.g. channel #3, a demagnetizing AC field with gradually decreasing amplitude (e.g. 60 Hz field applied for 2 seconds) is applied to the magnet element to remove the strain on the fiber grating. The ADD operation is performed in a similar manner (e.g. for channels #4, #9, #14 and #23) but with a backward transmission through a circulator and Bragg reflection in the forward direction.

It is to be understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. A tunable optical fiber grating device comprising:
   a length of optical fiber including an optical grating along a portion of its length;
   a pair of magnets secured to said fiber on opposite sides of said grating;
   an electromagnet for applying a magnetic field to said magnets, thereby inducing force between said magnets and creating strain across said grating, the magnets of said pair maintaining a remanent strain in said grating.

2. A tunable grating device according to claim 1 further comprising a flux return path extending between opposites of said pair of magnets for reducing magnetic field leakage.

3. A tunable grating device according to claim 1 including a current source for activating said electromagnet by a DC pulse for producing sufficient remanent magnetization of the magnets of said pair to maintain a remanent strain in said grating.

4. A tunable grating device according to claim 1 including a current source for applying a diminishing AC current to said electromagnet for removing remanent magnetization of said pair of magnets.

5. A tunable grating device according to claim 1 wherein said magnets are spaced apart with adjacent ends having opposite magnetic polarity.

6. A tunable grating device according to claim 1 wherein said magnets are spaced apart with adjacent ends having the same magnetic polarity.

7. A tunable grating device according to claim 1 further comprising a current source for applying a pulsed current to said electromagnet.

8. A tunable grating device according to claim 1 wherein the magnets of said pair exhibit a square hysteresis loop for producing a grating device having a bistable wavelength response.

9. A tunable grating device according to claim 1 wherein said magnets are secured to said fiber through a non magnetic extension.

10. A tunable grating device according to claim 1 wherein said magnets are secured to said fiber through an extension of magnetic material.

11. A tunable grating device according to claim 1 wherein said magnets are secured to said fiber through an extension of soft magnetic material.

12. A tunable grating device according to claim 1 wherein said fiber is secured to one magnet of said pair through a nonmagnetic substrate.

13. In an optical multiplexer/demultiplexer comprising least at one optical circulator and at least one optical circulator and at least one optical fiber grating interconnected by optical communication channel from said fiber, the improvement wherein said optical fiber grating is a tunable grating according to claim 1.

14. In an N-channel optical ADD/DROP multiplexer/demultiplexer comprising a plurality of optical circulators and a plurality of optical fiber gratings interconnected by an optical fiber for adding and/or dropping an optical communications channel from said fiber, the improvement wherein at least one optical fiber grating is a tunable grating according to claim 1.

15. A wave division multiplexed optical communications system comprising a source of multiple wavelength optical signal channels transmitted from said source along an optical trunk fiber through a multiplexer/demultiplexer, wherein said multiplexer/demultiplexer comprises a device according to claim 1.

* * * * *